Feb. 17, 1942. G. C. CHASE 2,273,251
CALCULATING MACHINE
Filed July 27, 1940 7 Sheets-Sheet 1

WITNESS
A. Henkern-Siefken

INVENTOR
George C. Chase
Stuart Hilde ATTORNEY

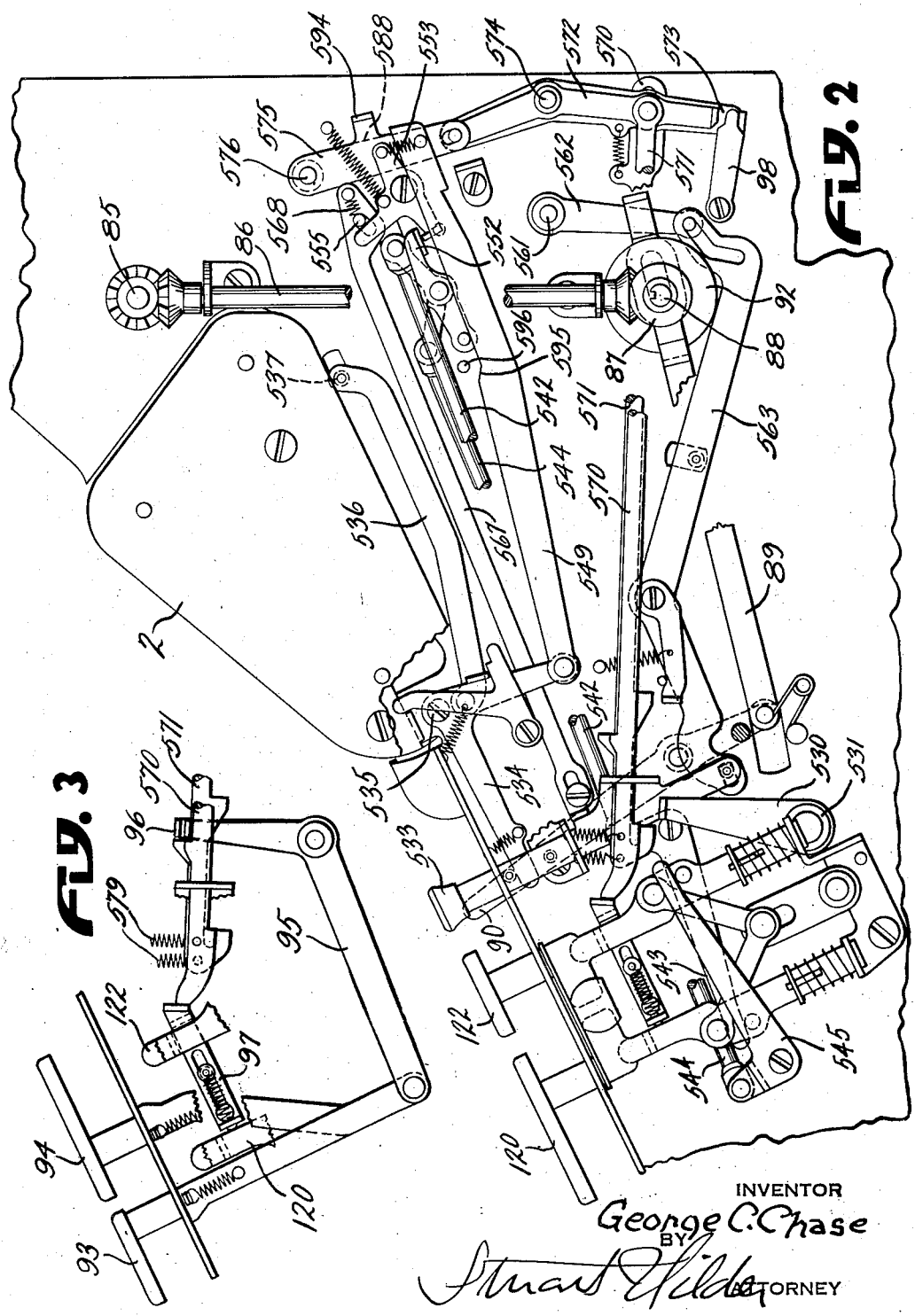

Feb. 17, 1942.      G. C. CHASE      2,273,251
CALCULATING MACHINE
Filed July 27, 1940      7 Sheets-Sheet 3

INVENTOR
George C. Chase
BY
Stuart Hill
ATTORNEY

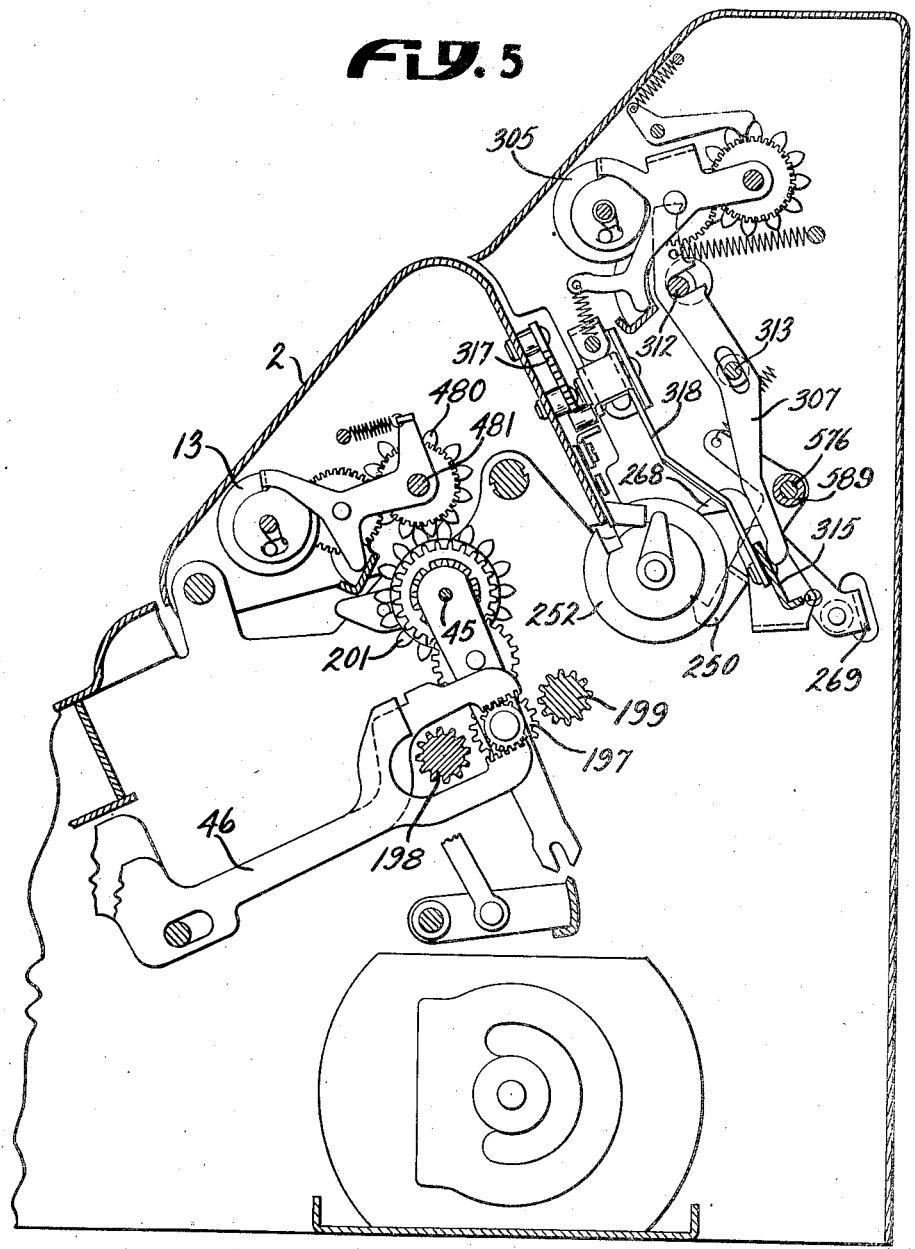

Feb. 17, 1942.　　　G. C. CHASE　　　2,273,251
CALCULATING MACHINE
Filed July 27, 1940　　　7 Sheets-Sheet 5
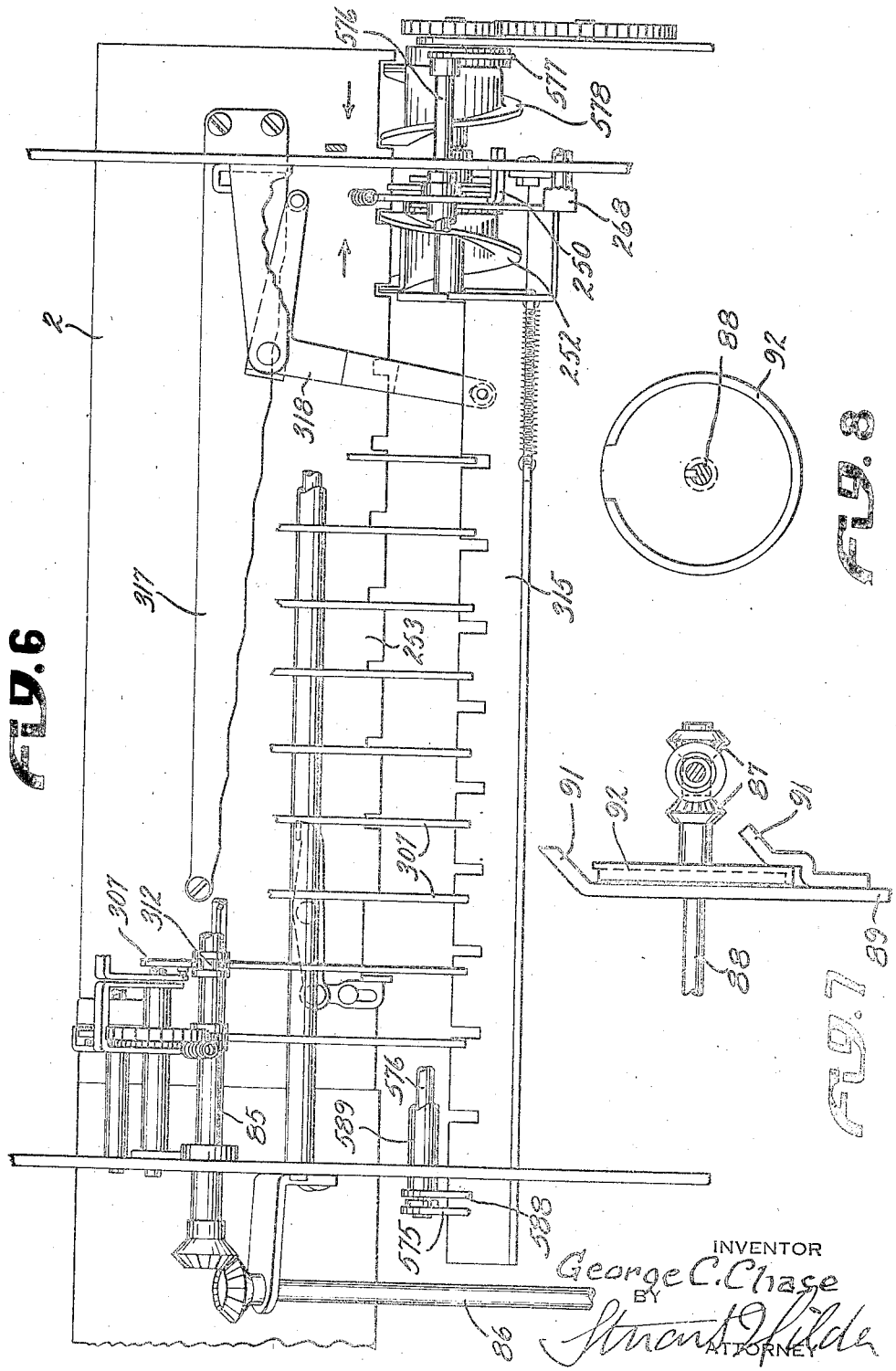
INVENTOR
George C. Chase
BY
ATTORNEY Feb. 17, 1942.                 G. C. CHASE                    2,273,251
                          CALCULATING MACHINE
                          Filed July 27, 1940              7 Sheets-Sheet 6
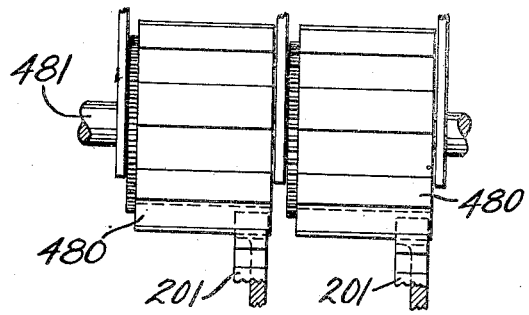
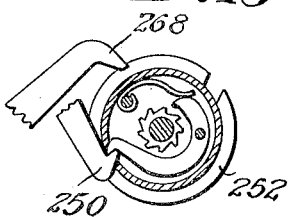
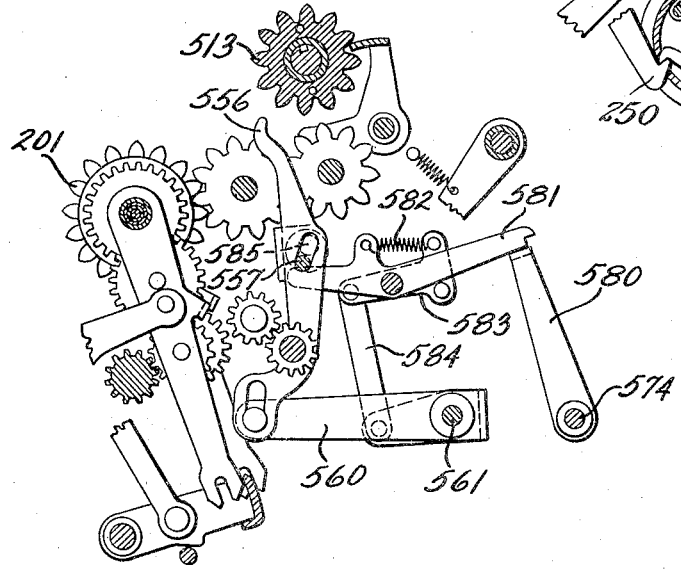

Feb. 17, 1942.  G. C. CHASE  2,273,251
CALCULATING MACHINE
Filed July 27, 1940  7 Sheets-Sheet 7
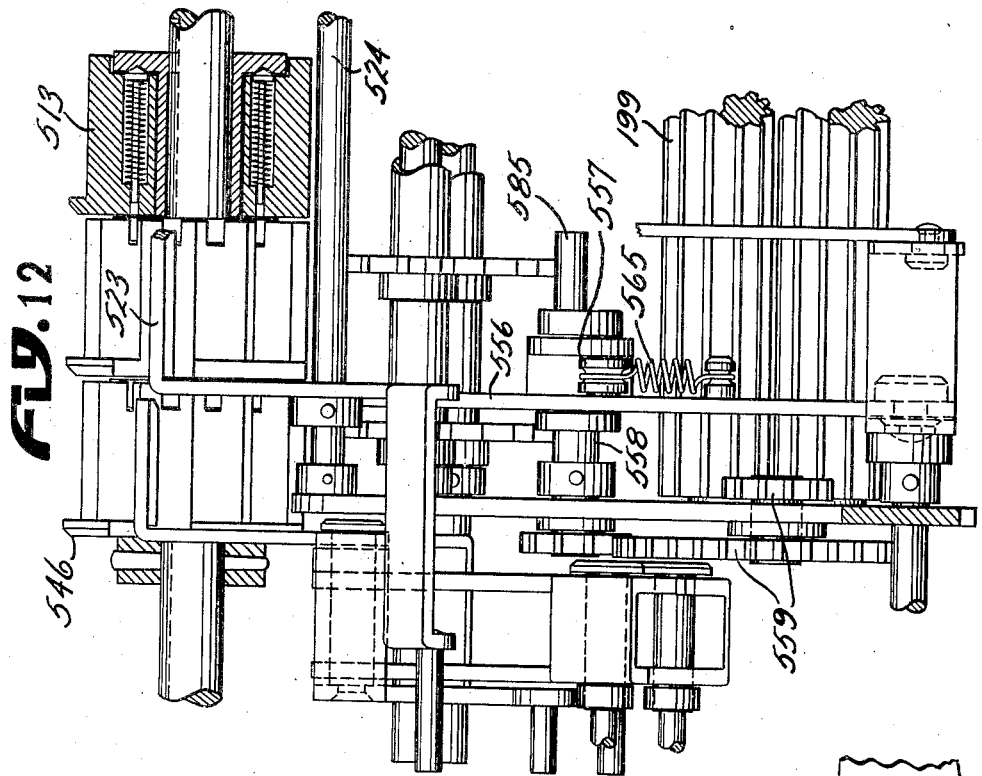
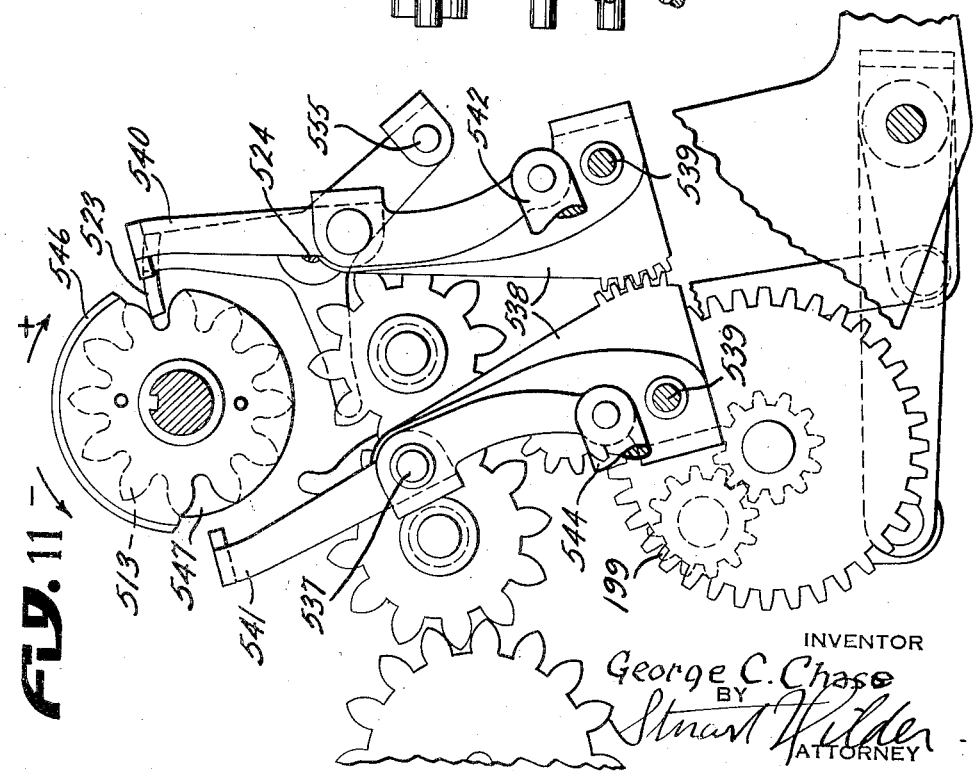
INVENTOR
George C. Chase
BY
Stuart Wilder
ATTORNEY Patented Feb. 17, 1942

2,273,251

UNITED STATES PATENT OFFICE 2,273,251

CALCULATING MACHINE

George C. Chase, South Orange, N. J., assignor to Monroe Calculating Machine Company, Orange, N. J., a corporation of Delaware Application July 27, 1940, Serial No. 347,920

11 Claims. (Cl. 235—63)

The invention has relation to calculating machines, and more particularly to means for concurrently denominationally shifting a register relatively to its differential actuator and effecting registration thereon.

The invention consists in the novel construction and combination of parts, as set forth in the appended claims.

In the accompanying drawings, illustrating the invention:

Fig. 2 is a right side elevation of the machine, with casing removed and parts broken away.

Fig. 3 is a detail right side elevation of the carriage shift keys.

Fig. 5 is a section of the rear portion of the machine, taken through the registering mechanism.

Fig. 6 is a rear elevation of the carriage and carriage shifting mechanism.

Fig. 7 is a detail plan view of a portion of the change lever mechanism.

Fig. 8 is a detail left elevation of a disk seen in Fig. 7.

Fig. 9 is a detail rear elevation of the elongated transmission gears.

Fig. 10 is a detail section showing the multiplier counting finger and associated parts.

Fig. 11 is a detail elevation of the multiplier storage wheels and associated parts.

Fig. 12 is a rear elevation of the parts shown in Fig. 11.

Fig. 13 is a detail side elevation of a carriage shifting clutch, with the casing broken away.

In these drawings the invention is shown as applied to a calculating machine constructed in accordance with the disclosures of applicant's copending applications Serial No. 285,860, filed July 22, 1939, and Serial No. 316,738, filed February 1, 1940, the first-named application concerning automatic division mechanism and the second application showing automatic multiplication mechanism, both applications providing for concurrent registration and shifting as applied to the automatic mechanism disclosed. Details of the motor drive and operation control mechanism are shown in United States Patent No. 1,566,650, issued to the present applicant on December 22, 1925.

Registration

Figure 1:
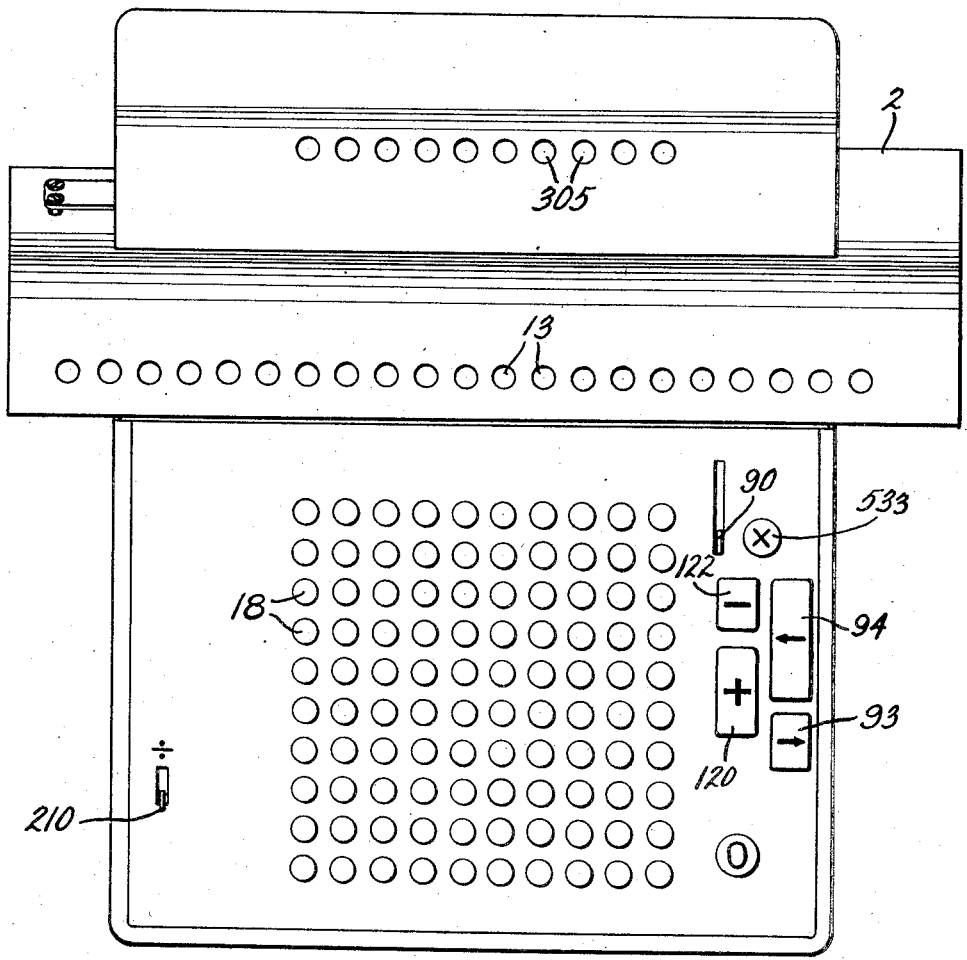
Fig. 1 is a plan view of a calculating machine to which the invention is shown as applied.
Figure 4:
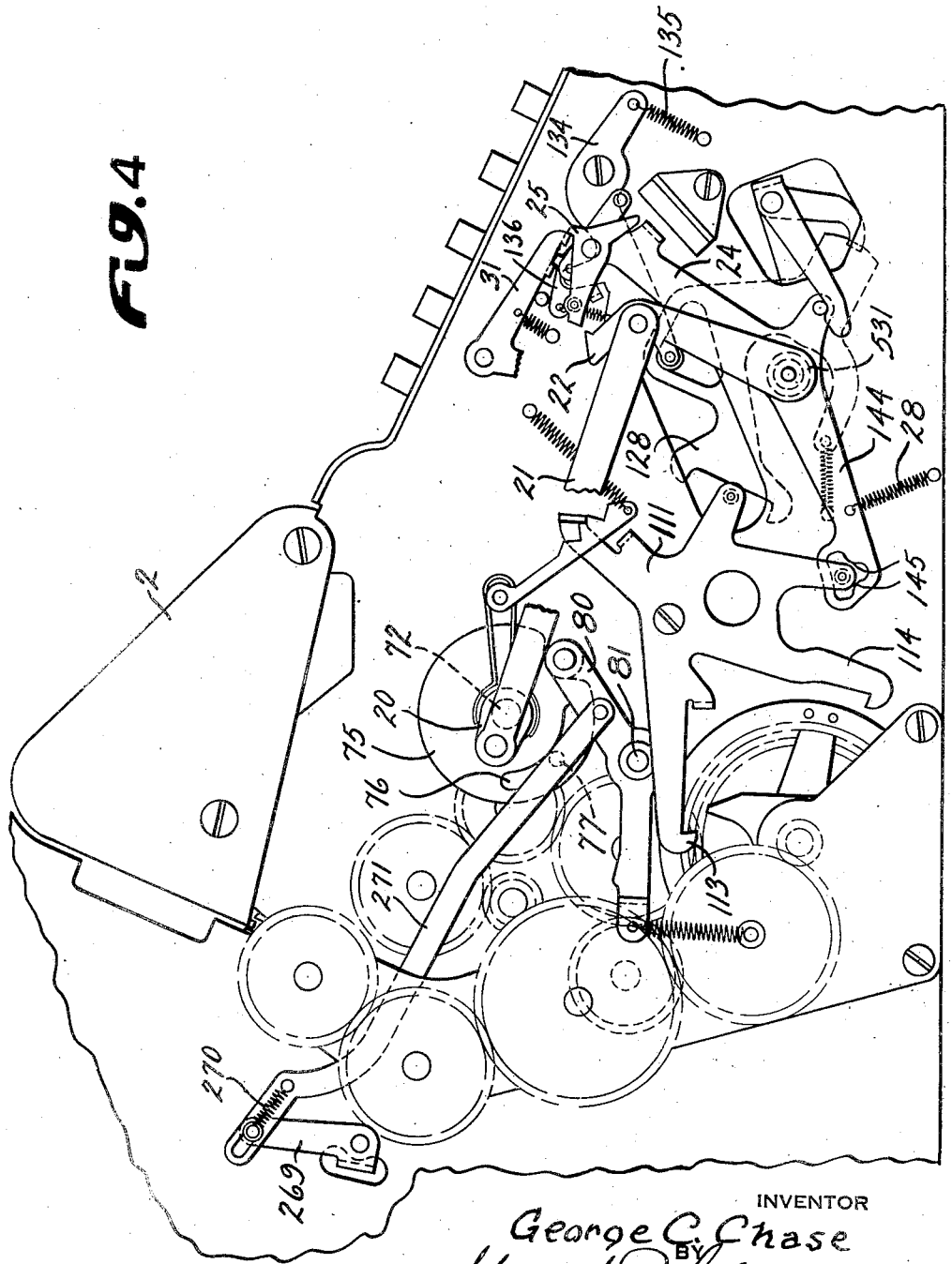
Fig. 4 is a left side elevation of the machine, with casing removed and parts broken away.

The machine is equipped with an electric motor, and is provided with various operation control keys, as seen in Fig. 1. A plus bar 120 (Fig. 2) and a minus bar 122 are connected with a setting lever 128 (Fig. 4), as set forth in detail in Patent No. 1,566,650, which lever is adapted to operate a reversing clutch lever 111. The depression of plus bar 120 will rock lever 128 counter-clockwise as seen in Fig. 4, bringing an arm 114 of clutch lever 111 into contact with an element of the differential gearing described in the above-mentioned patent, thereby effecting additive rotation of the registering mechanism. Similarly, depression of minus bar 122 will rock lever 128 clockwise as viewed in Fig. 4, and will engage an arm 113 of clutch lever 111 with another element of the differential gearing, effecting subtractive rotation of the registering mechanism.

Registration will continue so long as the bar 120 or 122 is held depressed by the operator. Upon release of the bar a spring 135, operating through arm 134, will restore lever 128 to its normal position, and will bring a pawl 136, mounted on arm 134, into contact with a trigger 31, rocking the trigger and releasing a spring pawl 25, mounted upon a stopping arm 24. Pawl 25, being released, will move into the path of movement of a rock arm 22, connected by link 21 and crank arm 20 with a shaft 72, driven in cycle with the differential actuators. As the parts move through full cycle position, arm 22 will contact with pawl 25, driving arm 24 forwardly, against the tension of a spring 28. In this movement, an extension 144 of arm 24 will be raised, bringing a cam surface 145 of said extension against a pin of clutch lever 111 and thereby disengaging the clutch. The parts will be returned to full cycle position by spring 28, pawl 25 again engaging trigger 31 and being lifted out of contact with rock arm 22.

During the above described operations, amounts set in the keyboard 18 (Fig. 1) will be registered positively or negatively in the numeral wheels 13. The keys 18 operate through slides 46 (Fig. 5) to adjust pinions 197 into mesh with gears 198 and 199, oppositely rotated during the engagement of the clutch, movement being transmitted through pinions 197 to a train of differential actuator gearing, described in the above-noted co-pending applications and in United States Patent No. 2,233,912, issued to the present applicant on March 4, 1941. The output gears 201 of these differentials, mounted on a shaft 45, engage gears 480, mounted on a shaft 481, supported in a transversely shiftable register carriage 2. Gears 480 are operatively connected with the numeral wheels 13 of the product-dividend register.

The cycles of registration on the numeral wheels 13 will be counted in a multiplier-quotient register 305 (Fig. 5) by means of one of a series of counting fingers 307, supported upon a rod 313 and operated each by a crank pin 312 of a crank shaft 85 (Fig. 6). All but one of the counting fingers 307 are held in inactive position by means of a plate 315, this plate being notched to provide a series of vernier teeth. Plate 315 is held to the left by a spring, against the tension of which it is moved stepwise toward the right during the shifting of carriage 2 toward the right, by means of a lever 318, engaging the plate and having a roller contacting with a cam plate 317 fixed upon the carriage. As plate 315 is moved toward the right one after another of the counting fingers 307 (from right to left) will register with the notches of the plate, and will thereby be allowed to operate during the rotation of cam shaft 85. Upon movement of carriage 2 toward the left, plate 315 will be moved step by step toward the left (toward the right as viewed in Fig. 6) by its spring, and the counting fingers 307 will be freed for operation in reverse order.

Crank shaft 85 is driven from a shaft 86 which has reverse gearing connections 87 (Fig. 7) with a shaft 88 driven in cycle with the differential actuators. The reversing gears 87 are shifted by a slide 89, connected with a change lever 90 (Figs. 1 and 2) extending through the keyboard plate. When lever 90 is located toward the front of the machine the counting fingers 307 are so operated that the registration on the wheels 305 is of the same sign character as the registration on the wheels 13. When lever 90 is set toward the rear of the machine, the registration on the wheels 305 will be opposite in sign to that on the wheels 13.

Slide 89 is provided with opposed cam faces 91, as seen in Fig. 7, acting upon a disk 92 fast upon the sleeve of the gears 87, which is keyed to shaft 88. Disk 92 is provided with a flange, as seen in Fig. 8, this flange being broken away to provide a gap which in the full cycle position of the parts is located opposite the rearmost cam portion 91. In the position of the parts shown in Fig. 7 forward movement of slide 89 can be effected only in the full cycle position of disk 92, since the rearmost cam portion 91 would otherwise engage the flange of the disk before the forward cam portion 91 is disengaged from the opposite face of the disk. Likewise, in the opposite shifted position of the parts, the rearward cam portion 91 will lie within the flange of disk 92, and the shift cannot be effected until the gap in the flange is located opposite the said cam portion.

Carriage shift

Provision is made for shifting the carriage 2 toward the right or toward the left by power from the motor, this shift being controlled by a right shift key 93 and a left shift key 94 (Figs. 1 and 3). These keys operate bell crank levers 95 and 96 having lugs each normally lying in rear of a cooperating lug of a related carriage shift bar 570 or 571, having operating connections with levers 572 and 573 (Fig. 2). Lever 572 is connected with an arm 575 fast upon a shaft 576, having at the other end thereof a clutch detent 577 (Fig. 6) normally restraining spring engagement of a one cycle clutch, of well-known design, to which is attached a right shift worm 578, operating upon a toothed plate of the carriage 2. Lever 573 has operating connection with an arm 588, fast upon a sleeve 589 (Fig. 5), surrounding the shaft 576, said sleeve having at its opposite end a detent 250 normally restraining the engagement of a clutch attached to a left shift worm 252, also engaging the toothed plate of the carriage.

Depression of key 93 will therefor withdraw detent 577 from its clutch, and worm 578 will be driven to shift the carriage toward the right, the shift continuing so long as key 93 is held depressed. Upon release of the key detent 577 will fall upon the housing of the clutch, ready to disengage the same in known manner when the clutch has completed its cycle. Similarly, depression of key 94 will lift detent 250, and worm 252 will operate to move the carriage toward the left.

Concurrent operation

The mechanism so far described, considered by itself, has many equivalents in the prior art. However, according to the invention, means are provided for concurrently shifting the carriage and effecting a registration, this means being shown in its simplest form in connection with the operation of the plus and minus bars 120, 122 and the left shift key 94.

For this purpose the gears 480 (Fig. 5), located in carriage 2 and engaging the gears 201, located in the base of the machine, are extended longitudinally, as seen in Fig. 9, the gears 480 and 201 forming part of the transmission means between the differential actuators and the register 13. Normally the gears 201 engage the left hand marginal portions of the gears 480, so that approximately three-fourths of a step of denominational shifting movement of the carriage 2 may be made while the respective gears remain in engagement, assuming that the plus or minus bar 120, 122 is depressed simultaneously with the left shift key 94. At three-quarter shift the gears 480 and 201 lie in the extreme position which will afford proper driving mesh engagement, this being conveniently termed extreme contacting position.

It is necessary, however, that the final one-fourth step of shifting movement shall not be effected until the keys are released and the registration completed. For this purpose a three-quarters shift detent 268 (Fig. 5) is provided for the left shift clutch, this detent being moved to engaging position during the cycling of the differential actuators, and retracted when the actuator drive is brought to rest. This is effected by means of a pair of disks 75, 76 (Fig. 4), the former being fast upon a shaft 72 driven in cycle with the differential actuators, and disk 76 being loosely mounted on said shaft and connected with the disk 75 by pin and slot connection 77. Each of these disks is provided with a notch, the notches normally standing in register with each other and being engaged by a roller of a follower lever 80. Upon engagement of the main clutch disk 75 will be driven, lifting the roller of the follower 80 out of the notch, after which disk 75 will pick up disk 76, through the pin and slot connection, in which position of the disks the two notches are out of line and follower 80 will be held in operative position so long as rotation is continued. When the operation is stopped, the parts are run through and beyond full cycle position, as hereinbefore described, and will thereafter be returned to full cycle position.

During this return movement disk 75 will be driven reversely, the pin of connection 77 moving idly in the slot and the notches of the two disks coming into line as the parts are brought to rest. This will allow follower 80 to move back into its normal position, under the influence of a suitable spring. Follower 80 is connected by link 271 with an extension 269 of the three-quarters shift detent 268, link 271 having pin and slot connection with extension 269, normally held in the position illustrated in Fig. 4 by means of a spring 270. When the machine is at rest, the roller of follower lever 80 will lie in the notches of the disks, and link 271 will hold detent 268 in disengaged position. Upon a registering operation of the machine, however, follower 80 will be rocked clockwise as seen in Fig. 4 and spring 270 will operate to move detent 268 into engaging position.

If, therefore, registration has not been completed during the first three-quarters shift of the carriage, detent 268 will act to disengage the left shift clutch and to hold it disengaged until the completion of the registration, whereupon detent 268 will be retracted and the final quarter shift of the carriage effected. Upon the completion of the shifting operation detent 250 will operate to disengage the carriage left shift clutch, completing the operation. In case registration is completed during the first three-quarters shift of the carriage, detent 268 will be retracted, and the carriage will complete its shift without interruption.

An interlock 97 (Fig. 3) is provided between the right shift key 93 and the plus and minus bars 120, 122, this interlock consisting of a slide held by a spring against the end of shifting bar 570 and provided with shoulders movable into the path of movement of shouldered portions of the plus and minus bars 120, 122.

An interlock 98 may also be provided between the right and left shift levers 572 and 573.

In using the plus and minus bars or the shift keys alone, operations will be performed according to the well-known method, and the same methods may be employed in connection with concurrent shifting to the left and registering, except that where a registration is to be followed by a shift both the plus or minus bar and the left shift key are depressed and released at the same time. The operator, during a single calculation, may depress both keys and also either key singly, according to the requirements of the work, and thus any calculation and any method of calculation used in other machines equipped with such keys may be employed.

In order to simplify the present application, no automatic stop under control of the numeral wheels 13 has been shown. However, such a stop is illustrated and described in connection with the co-pending application Serial No. 285,860, hereinbefore referred to, and obviously such a stop could be used in connection with the plus, minus bar operations described herein. It will be noted that the control of the three-quarters shift detent is precisely the same as in the above-mentioned application, except that in said application the three-quarters detent is held out of action so long as the division lever is in inactive position. However, this is not essential. An automatic stop under the control of wheels 13 might also be constructed in accordance with the disclosure of Patent No. 1,566,650, provided that the differential actuator and tens transfer mechanism of that patent were employed. The use of such a stop in performing semi-automatic division by plus and minus bar operations is described in said Patent No. 1,566,650. Obviously, the entire automatic division mechanism of application Serial No. 285,860 may be included in a machine constructed in accordance with the present disclosure, whereby a complete division operation will be performed upon manipulation of a division lever 210.

*Automatic multiplication*

Multiplication may be performed, with automatic shifting of the carriage 2 to the right, in accordance with the disclosure of co-pending application Serial No. 316,738, hereinbefore referred to. According to this method of operation, the complete multiplier having been set into wheels located in the carriage 2 and the multiplicand being set up on the keyboard 18, a multiplication key 533 (Figs. 1 and 2) is depressed, whereupon the machine will perform the entire calculation.

The operation will best be described in connection with a multiplier wherein values have been set into the higher order storage wheels and wherein one or more of the storage wheels of lowest order stand at zero.

Each multiplier storage wheel comprises an elongated gear 513 (Figs. 10, 11 and 12) having a controlling disk fast thereto. The control disk has two opposed segmental faces 546, 547 of different diameter, providing, as will be seen, for the control of a multiplier registration according to the known shortcut method wherein the lower value digits represent normal values and the higher value digits complemental values. The controlling disk is also provided with a notch corresponding to the space between two teeth of the gear 513, this notch providing for the reception of a bail 523, extending across the series of storage wheels, entry of the bail into said notches, as seen in Fig. 11, indicating that all of the storage wheels are located at zero.

Since it is assumed that a multiplier value is registered in one or more of the higher order storage wheels, these wheels will have been rotated out of their zero position, and bail 523 will be held in clockwise rocked position as seen in that figure by contact thereof with the surface 546 or 547 of the displaced wheel, against the tension of a spring pressed lever 553 (Fig. 2) engaging a pin 555 of the bail. Pin 555, in addition to rocking the lever 553, will act through a spring 568 to place a latching bar 567 under tension, this bar having a lug adapted to engage a shoulder of multiplication key 533, when said key is depressed, to hold the key and parts operated thereby in multiplying position.

Upon depression, the multiplication key 533 will operate a bell crank lever 534 fulcrumed at 535 upon the framing, pushing a bar 549, pivotally connected to said lever, toward the rear of the machine. The rear end of bar 549 is held by a spring against a pin fixed in one arm of a whiffletree lever 552, said lever having at its other end engagement with the lever 553. Lever 553 having been displaced by bail 523, whiffletree lever 552 will be allowed to rock clockwise from the position illustrated in Fig. 2, permitting bar 549 to rise into the position in which its free end will lie behind a lug 594 of the right shift clutch operating arm 575. Therefore, upon movement of bell crank lever 534 by key 533, the rearward movement of bar 549 will rock arm 575 clockwise as seen in Fig. 2, disengaging the right shift clutch detent 577 (Fig. 6). As the bar 549 moves to the rear, a cam surface 595 thereof will engage a pin 596 fixed in the framing, so that at the end of the stroke bar 549 will be held beneath lug 594, where it will remain during the rest of the computation.

In order to provide for shifting of the carriage 2 through as many ordinal places as may be necessary, an arm 580 (Fig. 10) is fixed upon the shaft 574 to which the right shift lever 572 (Fig. 2) is also fast (left shift lever 573 being loosely mounted on said shaft). Upon rocking of arm 575 and lever 572 arm 580 will be moved from beneath a latch 581, pivoted upon the framing and provided with a spring 582 which at its other end is attached to a rocker 583. Rocker 583 is connected by link 584 to a lever 560 and is provided with a pin normally holding the latch 581 clear of arm 580. Lever 560 is fast to a shaft 561 provided with an arm 562 (Fig. 2) having pin and cam slot engagement with a lever 563 which, upon depression of multiplying key 533, is rocked in counter-clockwise direction as seen in Fig. 2. This movement will rotate rocker 583 clockwise as viewed in Fig. 10, allowing the latch 581 to fall into active position. As arm 580 moves rearwardly, latch 581 will engage the same and hold the right shift clutch detent in disengaged position.

Arm 580 will remain latched until the differential actuators begin cycling, whereupon a crank pin 585 (Figs. 10 and 12) of shaft 558 (which shaft is rotated in cycle with the differential actuators) will engage rocker 583 and lift latch 581.

The differential actuators will be started in operation by the following means:

Upon depression of the multiplication key 533 bell crank lever 534 will push a link 536, pivotally connected to said lever, toward the rear of the machine. The rearward end of link 536 is pivotally connected by means of stud 537 with one of a pair of scissors levers 538 (Fig. 11), fulcrumed at 539 and interconnected by segmental gear teeth. Thus upon depression of key 533 the upper end of the scissors levers will be rocked toward each other, carrying therewith a pair of sensing levers 540, 541 which are intermediately fulcrumed upon the upper ends of the scissors levers. The lower end of subtraction sensing lever 541 is connected by means of link 544 (Fig. 2) with a bell crank lever 545, adapted to depress the minus bar 122. Similarly, the lower end of addition sensing lever 540 is connected by link 542 to a bell crank lever 543, adapted to depress the plus bar 120. The upper ends of the sensing levers 540, 541 are provided with inwardly extending lugs adapted to be moved, when the scissors levers are closed, toward the controlling disk located in the operative multiplier column. In the lower order multiplier positions, wherein it was assumed the storage wheels stood at zero, both of these levers will move freely at their upper ends, and no operation of the links 542 and 544 will be effected. As the carriage 2 is shifted into a column in which a multiplier digit is stored, sensing lever 540 or 541 will engage the surface 546 of the control disk and will be cammed outwardly, operating about its intermediate fulcrum point and pulling down the plus or the minus bar, as called for by the nature of the registration. This action takes place after the carriage 2 has made a quarter step of shifting movement into the denominational position in which registration is to occur. Thereafter the shift and registration will be concurrently effected, until either the shift or the registration is completed. The upper lugs of the sensing levers 540, 541 are extended sufficiently to maintain engagement with the disk surface 546 until the carriage is stopped in full shifted position.

The storage wheels are counted back to zero step by step during the cycling of the actuators by means of a finger 556 (Fig. 10) mounted on an eccentric 557 formed on shaft 558. The finger 556 has pin and slot connection with the lever 560, by which the finger is held downwardly, out of operative position, so long as multiplication key 533 remains in raised position. Upon operation of the multiplication key, finger 556 upon being released from the restraint of lever 560, will be drawn upwardly by a spring 565 (Fig. 12), so that the upper end of the finger will trace an annular path, during the rotation of eccentric 557, advancing the related storage wheel gear one tooth, counter-clockwise or clockwise respectively as seen in Fig. 10, during each cycle of addition or subtraction.

When the storage wheel is counted back to zero, the sensing lever 540 or 541 will be released from disk surface 546, and the plus or minus bar will be released and restored by its spring. This will effect a disengagement of the main clutch and stopping of the differential actuators in full cycle position, as previously described.

Stopping of the differential actuators will serve to lift and relatch the carriage right shift detent 577 in disengaged position (to effect a shift) by the following means:

The carriage right and left shift bars 570, 571 (Fig. 2) are supported at their forward ends in a slotted flange of the stem of multiplication key 533, the forward end of the bars thus being lowered as the key is depressed out of the position illustrated in Fig. 2. This will bring the upper shoulders of said bars away from the lugs of the shift key bell cranks 95 and 96, and will bring a lower shoulder of the right shift bar 570 into the path of movement of a laterally bent extension of a lever 530, fixed upon a sleeve 531, on which sleeve is also fixed the stopping arm 24 (Fig. 4). The carriage left shift bar 571 also has a lower lug (used in connection with an automatic return of the carriage 2) but this latter lug lies below the laterally bent end of arm 530, when multiplication key 533 is in fully depressed position. Therefore, upon stopping of the actuators, arm 530 operating with stopping arm 24, will contact the lug of right shift bar 570, thereby rocking lever 572, to release and latch the right shift detent in disengaged position. This will set the carriage 2 for further shift to the right until another set storage wheel is encountered, irrespective of whether the carriage was shifting or was already at rest when stopping arm 24 operated. In the former case the differential actuators are brought to rest in full cycle position, so that pin 585 (Fig. 10) leaves latch 581 free to fall into position in front of arm 580, preventing the reengagement of the right shift detent with its clutch at the end of the shifting cycle.

It will be obvious that registration and shifting of the carriage to the right will be continued until all of the storage wheels have been counted back to zero, at which time bail 523 will fall into the notches of the control disks, retracting latching bar 567 and releasing the multiplication key 533, together with the parts connected thereto.

The means for initiating a multiplication operation in examples wherein a digit is registered in the units order storage wheel is fully disclosed in application Serial No. 316,738. It is not particularly pertinent to the present invention, since the shifting and actuator cycling movements are not concurrently effected in the units order.

I claim:

1. In a calculating machine having cyclic differential actuators and a relatively denominationally shiftable register; transmission gearing between said actuators and register including spaced pairs of relatively shiftable elements, one element of each pair being elongated, means for cycling the actuators, means operable concurrently with said cycling means for shifting the relatively shiftable parts, and means for interrupting operation of the shift means with said transmission elements in extreme contacting position.

2. In a calculating machine having cyclic differential actuators and a relatively denominationally shiftable register; transmission gearing between said actuators and register including spaced pairs of relatively shiftable elements, one element of each pair being elongated, means for cycling the actuators, means operable concurrently with said cycling means for shifting the relatively shiftable parts, means for interrupting operation of the shift means with said transmission elements in extreme contacting position, and means for moving the interrupting means to inactive position upon termination of actuator cycling.

3. In a calculating machine having cyclic differential actuators and a relatively denominationally shiftable register; transmission gearing between said actuators and register including spaced pairs of relatively shiftable elements, one element of each pair being elongated, means for cycling the actuators, means operable concurrently with said cycling means for shifting the relatively shiftable parts, means for interrupting operation of the shift means with said transmission elements in extreme contacting position, means for moving the interrupting means to inactive position upon termination of actuator cycling, and means timed to operate upon contact of the elongated elements with the transmission elements of the next adjacent pairs to restart actuator cycling.

4. In a calculating machine having cyclic differential actuators and a relatively denominationally shiftable register; transmission gearing between said actuators and register including spaced pairs of relatively shiftable elements, one element of each pair being elongated, means for cycling the actuators, means operable concurrently with said cycling means for shifting the relatively shiftable parts, means for arresting operation of the shift means with said transmission elements in one extreme contacting position, and means for interrupting operation of the shift means with said transmission elements in the opposite extreme contacting position.

5. In a calculating machine having cyclic differential actuators and a relatively denominationally shiftable register; transmission gearing between said actuators and register including spaced pairs of relatively shiftable elements, one element of each pair being elongated, means for cycling the actuators, means operable concurrently with said cycling means for shifting the relatively shiftable parts, means for arresting operation of the shift means with said transmission elements in one extreme contacting position, means for interrupting operation of the shift means with said transmission elements in the opposite extreme contacting position, and means for maintaining said interrupting means in active position during actuator cycling.

6. In a calculating machine having cyclic differential actuators and a relatively denominationally shiftable register; transmission gearing between said actuators and register including spaced pairs of relatively shiftable elements, one element of each pair being elongated, means for cycling the actuators, means operable concurrently with said cycling means for shifting the relatively shiftable parts and cycling the actuators including a spring engaged shifting clutch and actuator driving means, means for arresting operation of the driving means and locating the actuators in full cycle position, a detent engageable with the shifting clutch to arrest operation of the shift means with said transmission elements in one extreme contacting position, a detent engageable with the shifting clutch to arrest operation of the shift means with said transmission elements in the opposite extreme contacting position, and means controlled by the actuator driving means for maintaining one of said detents in engaging position during operation of said driving means.

7. In a calculating machine having cyclic differential actuators and a relatively denominationally shiftable register; transmission gearing between said actuators and register including spaced pairs of relatively shiftable elements, one element of each pair being elongated, means for cycling the actuators including actuator driving means, means operable concurrently with said cycling means for shifting the relatively shiftable parts including a spring engaged shifting clutch, means for arresting operation of the driving means and locating the actuators in full-cycle position, a detent engageable with the shifting clutch to arrest operation of the shift means with said transmission elements in one extreme contacting position, a shift key operable to release said detent, a second detent engageable with said clutch to arrest operation of the shift means with said transmission elements in the opposite extreme contacting position, and means controlled by the actuator driving means for maintaining the second named detent in engaging position during operation of said driving means.

8. In a calculating machine having cyclic differential actuators and a relatively denominationally shiftable register; transmission gearing between said actuators and register including spaced pairs of relatively shiftable elements, one element of each pair being elongated, means for cycling the actuators, means operable concurrently with said cycling means for shifting the relatively shiftable parts alternatively in one or the other direction, means for arresting operation of the shift means with said transmission elements in one extreme contacting position, and means for interrupting operation of the shift means with said transmission elements in the opposite extreme contacting position.

9. In a calculating machine having cyclic differential actuators and a relatively denominationally shiftable register; transmission gearing between said actuators and register including spaced pairs of relatively shiftable elements, one element of each pair being elongated, means for cycling the actuators, means operable concurrently with said cycling means for shifting the relatively shiftable parts alternatively in one or the other direction including a spring engaged right shift clutch and a spring engaged left shift clutch, a detent engageable with the right shift clutch to arrest operation of the shift means with said transmission elements in one extreme contacting position, and a detent engageable with the left shift clutch to arrest operation of the shift means with said transmission elements in the opposite extreme contacting position.

10. In a calculating machine having cyclic differential actuators and a relatively denominationally shiftable register; transmission gearing between said actuators and register including spaced pairs of relatively shiftable elements, one element of each pair being elongated, means for cycling the actuators including actuator driving means, means operable concurrently with said cycling means for shifting the relatively shiftable parts including shifting clutches adapted to arrest operation of the shift means with said transmission elements in one or alternatively in the opposite extreme contacting position, adjustably mounted operating levers for said clutches, shift keys movable to operate the clutch operating levers, means for arresting operation of the driving means and locating the actuators in full-cycle position, and settable actuator drive and shift control means including a key movable to adjust the shift operating levers out of cooperating relation with the shift keys and to move one of said levers into cooperating relation with the drive arresting means.

11. In a motor driven calculating machine having cyclic differential actuators and a relatively denominationally shiftable register; transmission gearing between said actuators and register including spaced pairs of relatively shiftable elements, one element of each pair being elongated, means for cycling the actuators, means operable concurrently with said cycling means for shifting the relatively shiftable parts, means for interrupting operation of the shift means with said transmission elements in extreme contacting position, and operation control means including a key depressible to effect operation of the actuator cycling means and a key depressible independently of or concurrently with the first-named key to effect operation of the shift means.

GEORGE C. CHASE.